United States Patent
Drapala et al.

(10) Patent No.: US 9,892,043 B2
(45) Date of Patent: *Feb. 13, 2018

(54) NESTED CACHE COHERENCY PROTOCOL IN A TIERED MULTI-NODE COMPUTER SYSTEM

(71) Applicant: INTERNATIONAL BUSINESS MACHINES CORPORATION, Armonk, NY (US)

(72) Inventors: Garrett Michael Drapala, Cary, NC (US); William J Lewis, Poughkeepsie, NY (US); Pak-kin Mak, Poughkeepsie, NY (US); Robert J Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,591

(22) Filed: Apr. 27, 2017

(65) Prior Publication Data

US 2017/0228317 A1    Aug. 10, 2017

Related U.S. Application Data

(63) Continuation of application No. 14/816,824, filed on Aug. 3, 2015, now Pat. No. 9,720,833, which is a continuation of application No. 14/549,429, filed on Nov. 20, 2014, now Pat. No. 9,727,464.

(51) Int. Cl.
*G06F 12/08* (2016.01)
*G06F 12/0817* (2016.01)
*G06F 12/0811* (2016.01)

(52) U.S. Cl.
CPC ...... *G06F 12/0824* (2013.01); *G06F 12/0811* (2013.01); *G06F 2212/60* (2013.01); *G06F 2212/621* (2013.01)

(58) Field of Classification Search
CPC .............. G06F 12/084; G06F 2212/62; G06F 12/0815; G06F 12/0811; G06F 2212/621; G06F 2212/283; G06F 12/0842; G06F 12/0833; G06F 12/0891; G06F 2212/6042; G06F 13/1663
See application file for complete search history.

(56) References Cited

U.S. PATENT DOCUMENTS

| | | |
|---|---|---|
| 5,895,487 A | 4/1999 | Boyd |
| 6,330,643 B1 | 12/2001 | Arimilli et al. |
| 6,510,496 B1 | 1/2003 | Tarui et al. |
| 6,918,012 B2 | 7/2005 | Venkitakrishnan et al. |
| 6,988,173 B2 | 1/2006 | Blake et al. |

(Continued)

OTHER PUBLICATIONS

Nowatzyk et al. The S3.mp Scalable Shared Memory Multiprocessor, 1994, p. 144-153 Proceedings of the Twenty-Seventh Annual Hawaii International Conference on System Sciences, IEEE. Website: <http://ieeexplore.ieee.org/stamp/stamp.jsp?arnumber=323149>.

(Continued)

*Primary Examiner* — Reginald Bragdon
*Assistant Examiner* — Thanh Vo
(74) *Attorney, Agent, or Firm* — William A. Kinnaman, Jr.

(57) ABSTRACT

A computer system comprising multiple nodes, each node comprising a plurality of processors and a local cache hierarchy, suppresses local cache coherency of a node operations or global cache coherency operations between nodes based on the coherency request being a global or local request, and the state of the cache line at the node.

17 Claims, 11 Drawing Sheets

(56) References Cited

U.S. PATENT DOCUMENTS

| | | |
|---|---|---|
| 7,076,597 B2 | 7/2006 | Webb et al. |
| 7,085,895 B2 | 8/2006 | Blake et al. |
| 7,085,898 B2 | 8/2006 | Blake et al. |
| 7,360,033 B2 | 4/2008 | Hum et al. |
| 7,389,389 B2 | 6/2008 | Gharachorloo et al. |
| 7,434,006 B2 | 10/2008 | Beers et al. |
| 7,669,013 B2 | 2/2010 | Carpenter et al. |
| 7,802,058 B1 | 9/2010 | Miller et al. |
| 7,904,676 B2 | 3/2011 | Hornung et al. |
| 7,925,857 B2 | 4/2011 | Averill et al. |
| 8,010,716 B2 | 8/2011 | Yamazaki et al. |
| 8,055,847 B2 | 11/2011 | Cantin, Jr. |
| 8,135,916 B1 | 3/2012 | O'Bleness et al. |
| 8,539,164 B2 | 9/2013 | Warner et al. |
| 2005/0018665 A1 | 1/2005 | Jordan et al. |
| 2005/0216637 A1 | 9/2005 | Smith |
| 2005/0240734 A1 | 10/2005 | Batson et al. |
| 2007/0022252 A1 | 1/2007 | Cen |
| 2008/0155145 A1 | 6/2008 | Stenfort |
| 2011/0016277 A1 | 1/2011 | Miller et al. |
| 2012/0005439 A1 | 1/2012 | Ukai |
| 2015/0186277 A1 | 7/2015 | Rowlands et al. |
| 2016/0147658 A1 | 5/2016 | Ambroladze et al. |
| 2016/0147659 A1 | 5/2016 | Drapala et al. |
| 2016/0147661 A1 | 5/2016 | Ambroladze et al. |

OTHER PUBLICATIONS

Disclosed anonymously(May 2005). Various Configurations of Chip Multiprocessor(CMP), System on a Chip(SOC) and Multi-core(MC) Integration. IPCOM000124954D. NPL provided in parent U.S. Appl. No. 14/549,429.

Disclosed anyonymously(2003). Method for instruction cache coherence on a processor with disjoint level-2 caches. IPCOM000010890D All 5 pages. NPL provided in parent U.S. Appl. No. 14/549,429.

Ekaterina M. Ambroladze et al. "Configuration Based Cache Coherency Protocol Selection", U.S. Appl. No. 14/816,636, filed Aug. 3, 2015.

Ekaterina M. Ambroladze et al. "Configuration Based Cache Coherency Protocol Selection", U.S. Appl. No. 14/548,938, filed Nov. 20, 2014.

Garrett Michael Drapala et al. "Nested Cache Coherency Protocol in a Tiered Multi-Node Commputer System", U.S. Appl. No. 14/816,824, filed Aug. 3, 2015.

AppendixP_PA "List of IBM Patents or Applications Treated as Related," Feb. 26, 2017 2 pages.

List of IBM Patents or Patent Applications Treated As Related—III, 2 pages, Jan. 3, 2018.

List of IBM Patents or Patent Applications Treated As Related—II 2 pages Jan. 3, 2018.

ns, each node

NESTED CACHE COHERENCY PROTOCOL IN A TIERED MULTI-NODE COMPUTER SYSTEM

FIELD OF THE INVENTION

The present invention is related to computer systems and more precisely to cache coherency protocols of multiprocessor systems.

BACKGROUND

Modern computer packaging technology provides for a modular design that may be used in a variety of computer system products in conjunction with a computer memory. In one example, multiple processor cores may be packaged on a single module or chip die. In another example, multiple chip cores may be packaged with storage control function on a single module or chip die. In an embodiment, the multiple processor cores employ a cache hierarchy on the module or chip die. In one embodiment, only a single core of the module or chip die may be used in a computer system. In one embodiment, only a single such module or chip die may be used in a computer system. In one embodiment, multiple such modules or chip dies may be used in a computer system. Each embodiment may require a different cache coherency protocol to efficiently perform desired function and performance.

U.S. Pat. No. 8,423,736 "MAINTAINING CACHE COHERENCE IN A MULTI-NODE, SYMMETRIC MULTIPROCESSING COMPUTER", filed 2010 Jun. 16 and incorporated by reference herein, teaches "Maintaining cache coherence in a multi-node, symmetric multiprocessing computer, the computer composed of a plurality of compute nodes, including, broadcasting upon a cache miss by a first compute node a request for a cache line; transmitting from each of the other compute nodes to all other nodes the state of the cache line on that node, including transmitting from any compute node having a correct copy to the first node the correct copy of the cache line; and updating by each node the state of the cache line in each node, in dependence upon one or more of the states of the cache line in all the nodes."

U.S. Pat. No. 8,402,225 "METHOD FOR PERFORMING CACHE COHERENCY IN A COMPUTER SYSTEM", filed 2010 Sep. 21 and incorporated by reference herein, teaches "in a computing system, cache coherency is performed by selecting one of a plurality of coherency protocols for a first memory transaction. Each of the plurality of coherency protocols has a unique set of cache states that may be applied to cached data for the first memory transaction. Cache coherency is performed on appropriate caches in the computing system by applying the set of cache states of the selected one of the plurality of coherency protocols."

U.S. Pat. No. 8,010,716 "METHODS AND APPARATUS FOR SUPPORTING MULTIPLE CONFIGURATIONS IN A MULTI-PROCESSOR SYSTEM", filed 2010 Aug. 18 and incorporated by reference herein, teaches "methods and apparatus provide for interconnecting one or more multiprocessors and one or more external devices through one or more configurable interface circuits, which are adapted for operation in: (i) a first mode to provide a coherent symmetric interface; or (ii) a second mode to provide a non-coherent interface."

U.S. Pat. No. 7,546,422 titled "Method and Apparatus for the Synchronization of Distributed Caches" filed 2002 Aug. 28, incorporated herein by reference in its entirety, teaches a hierarchical caching protocol suitable for use with distributed caches, including use within a caching input/output hub.

SUMMARY

The shortcomings of the prior art are overcome and additional advantages are provided through the provision of a mechanism for providing a multi-tiered cache coherency fabric.

A multi-node computer system comprising multiprocessors and a local cache hierarchy at each node employs a multi-tiered cache coherency fabric for handling coherency requests to a cache line of the cache. A local cache coherency fabric maintains cache coherency within the node, a global cache coherency fabric maintains cache coherency between nodes.

In an embodiment, cache coherency is provided in a processor system comprising a plurality of nodes, each node comprising a respective plurality of processors and a respective cache system, the processor system configured to perform a multi-tiered cache coherency protocol, the multi-tiered cache coherency protocol comprising local cache coherency operations within a node, and global cache coherency operations between nodes, the method comprising: based on receiving a coherency request for a cache line, determining, by a node, which multi-tiered cache coherency operation to perform; and based on the coherency state of the cache line at the node and the request being from the same node or another node, supporting, by the node, cache coherency for the cache line by suppressing any one of a local cache coherency operation or a global cache coherency operation.

In an embodiment concurrent on-node and off-node coherency requests are interlocked, the interlocking comprising: based on determining, by the node, that concurrent requests to the cache line are received concurrently, the concurrent requests comprising the coherency request and another coherency request wherein a first request of the two requests is from another node and a second request of the two requests is from a processor of the node, rejecting the second request.

In an embodiment, local coherency logic at a node maintains state information for all cache lines of the node, the node using the local coherency logic for determining which multi-tiered cache coherency operation to perform.

In an embodiment, the coherency request is a global coherency operation from another node, wherein the local coherency logic of the node determines the requested cache line is any one of not in any cache of the node or is invalid without any coherency operation to the local caches, the local coherency logic suppressing the local coherency request.

In an embodiment, the coherency request is a local coherency operation from a processor cache of the node, wherein the local coherency logic of the node determines the coherency operation can be performed without any global coherency operation, the local coherency logic suppressing a global coherency operation to perform the coherency request.

In an embodiment, the coherency request is a global coherency operation from another node, wherein local coherency logic of the node determines the request is for sharing the cache line, wherein the requested cache line is in the shared state in a local cache of the node, the local coherency logic providing the line from the local cache to the another node without performing a local coherency operation.

In an embodiment, the coherency request is a local coherency operation from a processor cache of the node, wherein the local coherency logic of the node determines request is a request for sharing the cache line, wherein the requested cache line is held by a cache of the node in any one of an M, E or S state, the local coherency logic permitting a local cache coherency operation and suppressing a global coherency operation to perform the coherency request.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

In modern multi-processor computer systems, a hierarchy of caches is used to buffer memory cache lines in order to reduce the access time overhead of data in memory. In order to give all processors, access to cached data, a coherency mechanism is employed to assure that one processor's cached value is coherent. For example, if multiple processors had the ability to modify the same cache line at the same time, neither one would be assured that its copy was correct. Thus, the coherency mechanism gives all processors a cached view of memory that would be consistent were there no cache at all, only a single main store. Such cache coherency is provided in an SMP (Symmetric multi-processor) computer system. There are many possible protocols that can be used to perform cache coherency in a large SMP system. Depending on the SMP structure and system configuration, some protocols may be better tailored than others with regards to bus utilization and system performance. Different SMP structures may also be better suited for different system packaging or customer capacity requirements.

Processor Cluster

Figure 5:
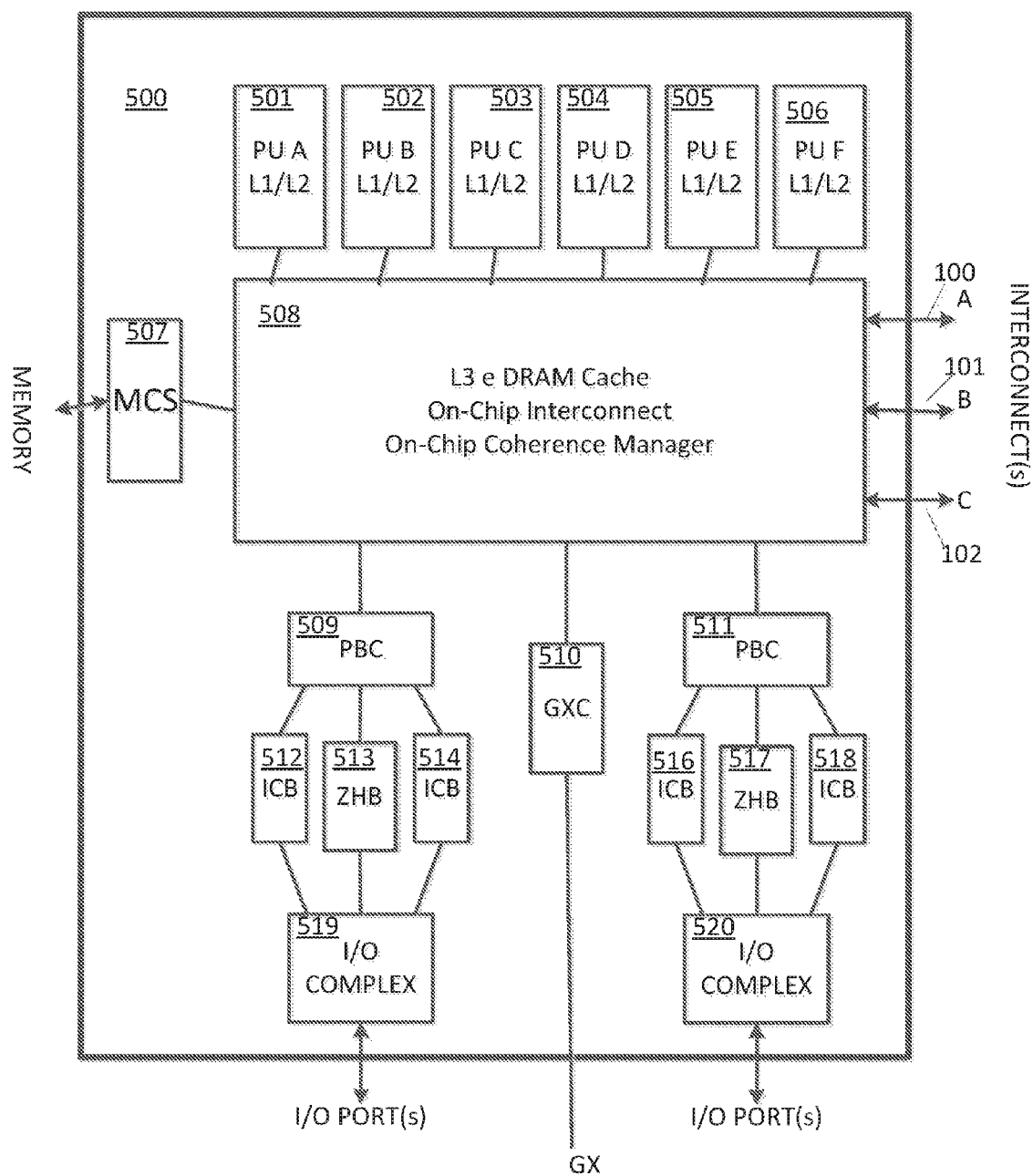
FIG. 5 depicts components of an example central processor (CP)
Figure 6:
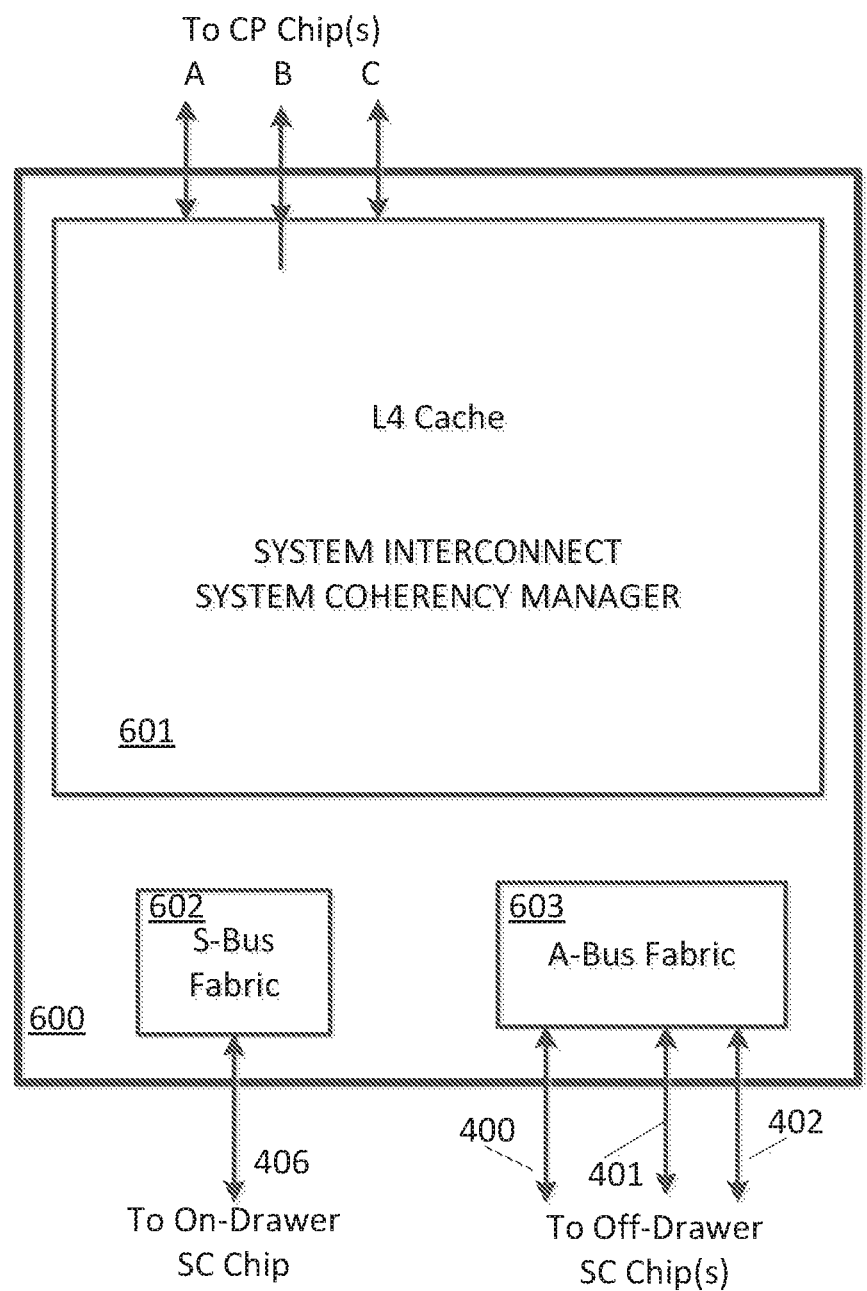
FIG. 6 depicts components of an example SC.

In embodiments (FIG. 5), a "cluster" 500 of one or more processing units, 501 to 506 (comprising one or more processor cores on a chip die for example), is the building block of different system structures. Each cluster may include a hierarchy of caches, for example local (level 1) caches (L1/L2) associated with respective processing units 501 to 506, and a cluster shared cache (L3), shared by all processing units 501 to 506 of the cluster. Each cache system of a cluster may be configurable to manage coherency within the cluster 500, or to participate with other clusters of the system to manage coherency among multiple clusters. Each cluster may be packaged as a single chip die, a module comprising multiple chip dies, or other packaging apparatus known in the art. Each cluster may be an identical configuration, or may be different configurations. For a first example, each cluster may comprise six processor cores 501 to 506. In a second example, one cluster may comprise six processor cores and another cluster may comprise four processor cores 501 to 504.

Figure 7:
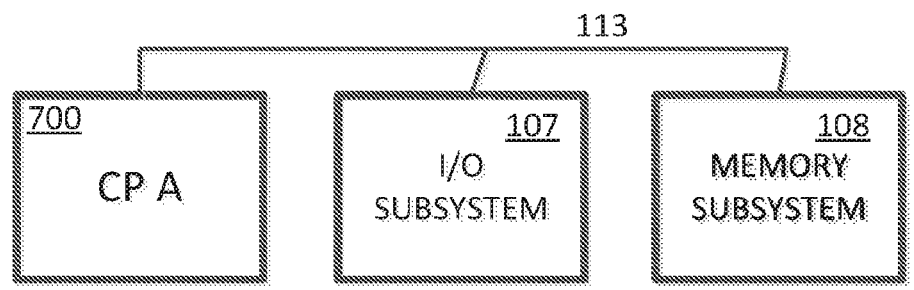
FIG. 7 depicts an example single CP configuration.

In an embodiment (FIG. 7), a system may consist of a single cluster 700. The cluster may be communicatively coupled 113 to memory subsystem 108 and an I/O subsystem 107 for attachment to peripheral or network devices. The single cluster cache coherency is managed by the single cluster.

In computing, cache coherence is the consistency of shared resource data that ends up stored in multiple local caches.

When clients in a system maintain caches of a common memory resource, problems may arise with inconsistent data. This is particularly true of central processing units (CPUs) in a multiprocessing system. Referring to the illustration on the right, if the top client has a copy of a memory block from a previous read and the bottom client changes that memory block, the top client could be left with an invalid cache of memory without any notification of the change. Cache coherence is intended to manage such conflicts and maintain consistency between cache and memory.

In a shared memory multiprocessor system with a separate cache memory for each processor, it is possible to have many copies of any one instruction operand: one copy in the main memory and one in each cache memory. When one copy of an operand is changed, the other copies of the operand must be changed also. Cache coherence is the discipline that ensures that changes in the values of shared operands are propagated throughout the system in a timely fashion.

There are three distinct levels of cache coherence.
1. every write operation appears to occur instantaneously
2. all processors see exactly the same sequence of changes of values for each separate operand
3. different processors may see an operation and assume different sequences of values; this is considered to be a non-coherent behavior.

In both level 2 behavior and level 3 behavior, a program can observe stale data. Recently, computer designers have come to realize that the programming discipline required to deal with level 2 behavior is sufficient to deal also with level 3 behavior. Therefore, at some point only level 1 and level 3 behavior will be seen in machines.

Coherence defines the behavior of reads and writes to the same memory location. The coherence of caches is obtained if the following conditions are met.

In a read made by a processor P to a location X that follows a write by the same processor P to X, with no writes of X by another processor occurring between the write and the read instructions made by P, X must always return the value written by P. This condition is related with the program order preservation, and this must be achieved even in monoprocessed architectures.

1. A read made by a processor P1 to location X that happens after a write by another processor P2 to X must return the written value made by P2 if no other writes to X made by any processor occur between the two accesses and the read and write are sufficiently separated. This condition defines the concept of coherent view of memory. If processors can read the same old value after the write made by P2, we can say that the memory is incoherent.

2. Writes to the same location must be sequenced. In other words, if location X received two different values A and B, in this order, from any two processors, the processors can never read location X as B and then read it as A. The location X must be seen with values A and B in that order.

These conditions are defined supposing that the read and write operations are made instantaneously. However, this doesn't happen in computer hardware given memory latency and other aspects of the architecture. A write by processor P1 may not be seen by a read from processor P2 if the read is made within a very small time after the write has been made. The memory consistency model defines when a written value must be seen by a following read instruction made by the other processors.

Rarely, and especially in algorithms, coherence can instead refer to the locality of reference.

Directory-Based

In a directory-based system, the data being shared is placed in a common directory that maintains the coherence between caches. The directory acts as a filter through which the processor must ask permission to load an entry from the primary memory to its cache. When an entry is changed the directory either updates or invalidates the other caches with that entry.

Snooping

This is a process where the individual caches monitor address lines for accesses to memory locations that they have cached. It is called a write invalidate protocol when a write operation is observed to a location that a cache has a copy of and the cache controller invalidates its own copy of the snooped memory location.

Snarfing

Snarfing is a mechanism where a cache controller watches both address and data in an attempt to update its own copy of a memory location when a second master modifies a location in main memory. When a write operation is observed to a location that a cache has a copy of, the cache controller updates its own copy of the snarfed memory location with the new data.

Distributed shared memory systems mimic these mechanisms in an attempt to maintain consistency between blocks of memory in loosely coupled systems.

The two most common mechanisms of ensuring coherency are snooping and directory-based, each having its own benefits and drawbacks. Snooping protocols tend to be faster, if enough bandwidth is available, since all transactions are a request/response seen by all processors. The drawback is that snooping isn't scalable. Every request must be broadcast to all nodes in a system, meaning that as the system gets larger, the size of the (logical or physical) bus and the bandwidth it provides must grow. Directories, on the other hand, tend to have longer latencies (with a 3 hop request/forward/respond) but use much less bandwidth since messages are point to point and not broadcast. For this reason, many of the larger systems (>64 processors) use this type of cache coherence.

For the snooping mechanism, a snoop filter reduces the snooping traffic by maintaining a plurality of entries, each representing a cache line that may be owned by one or more nodes. When replacement of one of the entries is required, the snoop filter selects for replacement the entry representing the cache line or lines owned by the fewest nodes, as determined from a presence vector in each of the entries. A temporal or other type of algorithm is used to refine the selection if more than one cache line is owned by the fewest number of nodes.

The MESI protocol (known also as Illinois protocol due to its development at the University of Illinois at Urbana-Champaign) is a widely used cache coherence and memory coherence protocol. It is the most common protocol which supports write-back cache.

Every cache line is marked with one of the four following states (coded in two additional bits):

Modified: The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive: The cache line is present only in the current cache, but is clean; it matches main memory. It may be changed to the Shared state at any time, in response to a read request. Alternatively, it may be changed to the Modified state when writing to it.

Shared: Indicates that this cache line may be stored in other caches of the machine and is "clean"; it matches the main memory. The line may be discarded (changed to the Invalid state) at any time.

Invalid: Indicates that this cache line is invalid (unused).

In a typical system, several caches share a common bus to main memory. Each also has an attached central processing unit (CPU) which issues read and write requests. The caches' collective goal is to minimize the use of the shared main memory.

A cache may satisfy a read from any state except Invalid. An Invalid line must be fetched (to the Shared or Exclusive states) to satisfy a read.

A write may only be performed if the cache line is in the Modified or Exclusive state. If it is in the Shared state, all other cached copies must be invalidated first. This is typically done by a broadcast operation known as Request For Ownership (RFO).

A cache may discard a non-Modified line at any time, changing to the Invalid state. A Modified line must be written back first.

A cache that holds a line in the Modified state must snoop (intercept) all attempted reads (from all of the other caches in the system) of the corresponding main memory location and insert the data that it holds. This is typically done by forcing the read to back off (i.e. retry later), then writing the data to main memory and changing the cache line to the Shared state.

A cache that holds a line in the Shared state must listen for invalidate or request-for-ownership broadcasts from other caches, and discard the line (by moving it into Invalid state) on a match.

A cache that holds a line in the Exclusive state must also snoop all read transactions from all other caches, and move the line to Shared state on a match.

The Modified and Exclusive states are always precise: i.e. they match the true cache line ownership situation in the system. The Shared state may be imprecise: if another cache discards a Shared line, this cache may become the sole owner of that cache line, but it will not be promoted to Exclusive state. Other caches do not broadcast notices when they discard cache lines, and this cache could not use such notifications without maintaining a count of the number of shared copies.

In that sense the Exclusive state is an opportunistic optimization: If the CPU wants to modify a cache line that is in state S, a bus transaction is necessary to invalidate all other cached copies. State E enables modifying a cache line with no bus transaction.

Clusters

Figure 8:
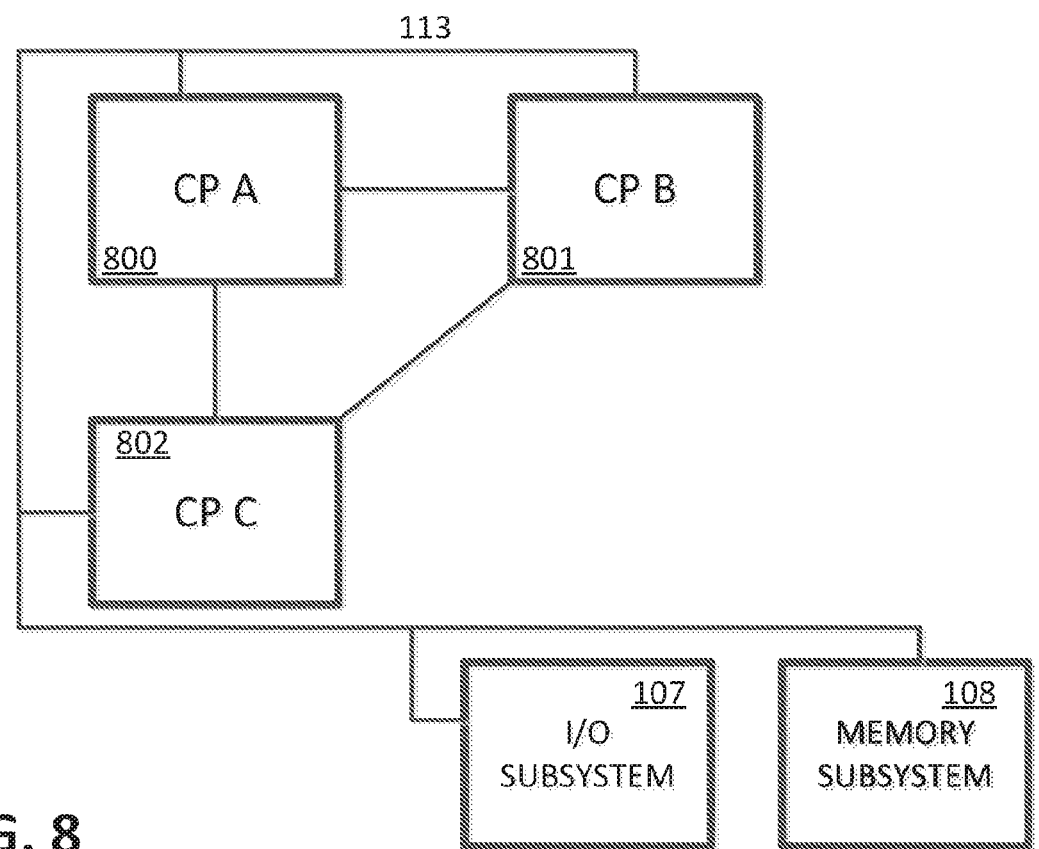
FIG. 8 depicts an example multi-CP configuration.

In an embodiment (FIG. 8), a system may consist of multiple clusters 800, 801, 802, the multiple clusters 800 to 802 may be communicatively coupled 113 to a shared memory 108 and I/O 107. The multiple clusters may include a shared L3 cache in one embodiment. Cache coherency may be managed cooperatively by the multiple clusters of the system.

In an embodiment (FIG. 1), the system may comprise a plurality of clusters 109 to 111 and a storage control (SC) function 112. The clusters interconnected 100, 101, 105 with each other and communicatively coupled 102, 103, 104 with the SC 112. The SC 112 may include a higher level cache (L4). Clusters 109 to 111 may be communicatively coupled 113 with a shared memory subsystem 108 and an I/O subsystem 107. In an embodiment, an interconnected plurality of clusters 109 to 111 and SC 112 may constitute a "node". In one embodiment the SC 112 includes an inclusive cache directory such that the SC 112 has knowledge of all lines of the node. In an embodiment, the inclusive cache directory function is distributed amongst the processors and may be implemented by the combined non-inclusive cache directories of all clusters of the node. The SC 112 may determine whether a cache access of the node can be handled entirely within the node (such as a processor of the node requesting ownership of a cache line already owned by a processor of the node), or that a cache access of the node must interrogate other nodes (such as a processor of the node requesting ownership of a cache line, not currently owned by the node). In an embodiment, the SC 112 function may be provided by cooperative logic of the processors 109 to 111 of the node. In this embodiment, the processors cooperate to determine if an access to an external node is required, and the requesting processor may then control coherency accesses to other nodes on behalf of the node. In another embodiment the SC 112 function may be provided by dedicated logic, perhaps in a separate chip die of the node for example.

A configuration (FIG. 1) may include computer storage media 114.

Figure 2:
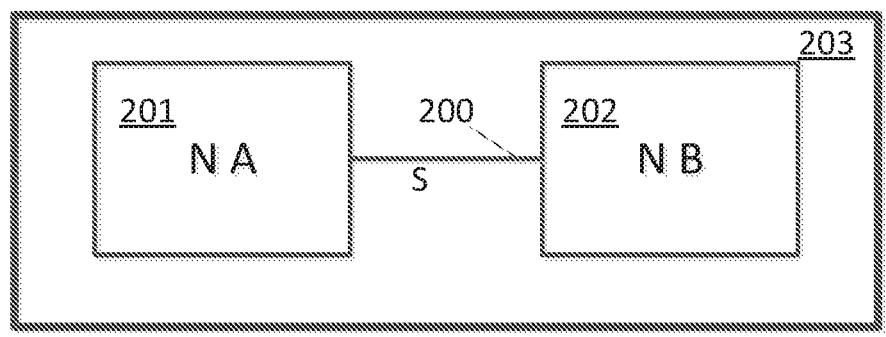
FIG. 2 illustrates one example of components of a drawer.

In an embodiment (FIG. 2), a plurality of nodes 201, 202 may be packaged as a "drawer" 203 and interconnected by an S-Bus 200.

Figure 3:
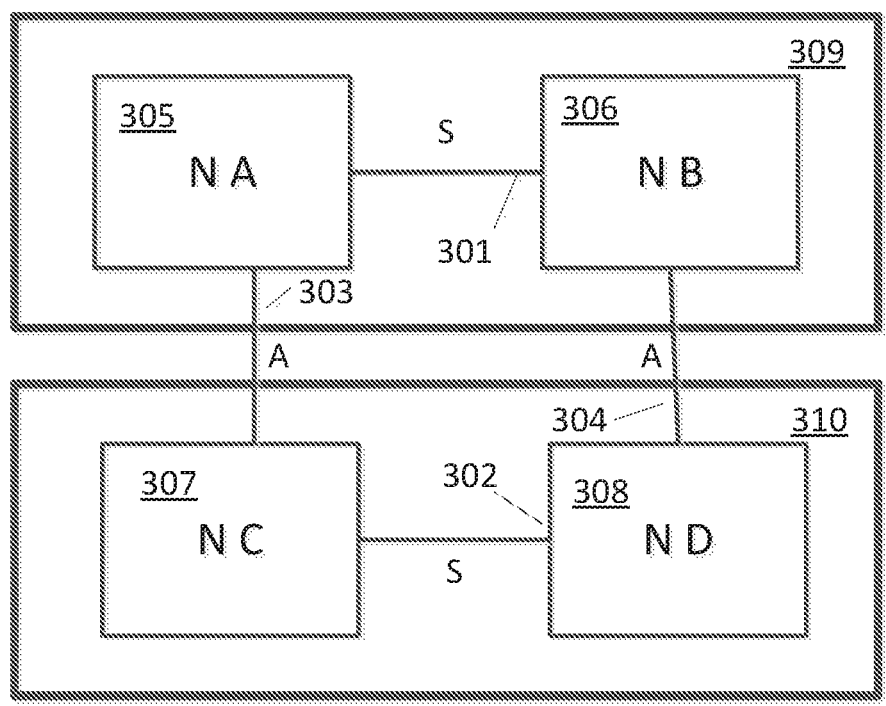
FIG. 3 illustrates one example of components of two drawers.
Figure 4:
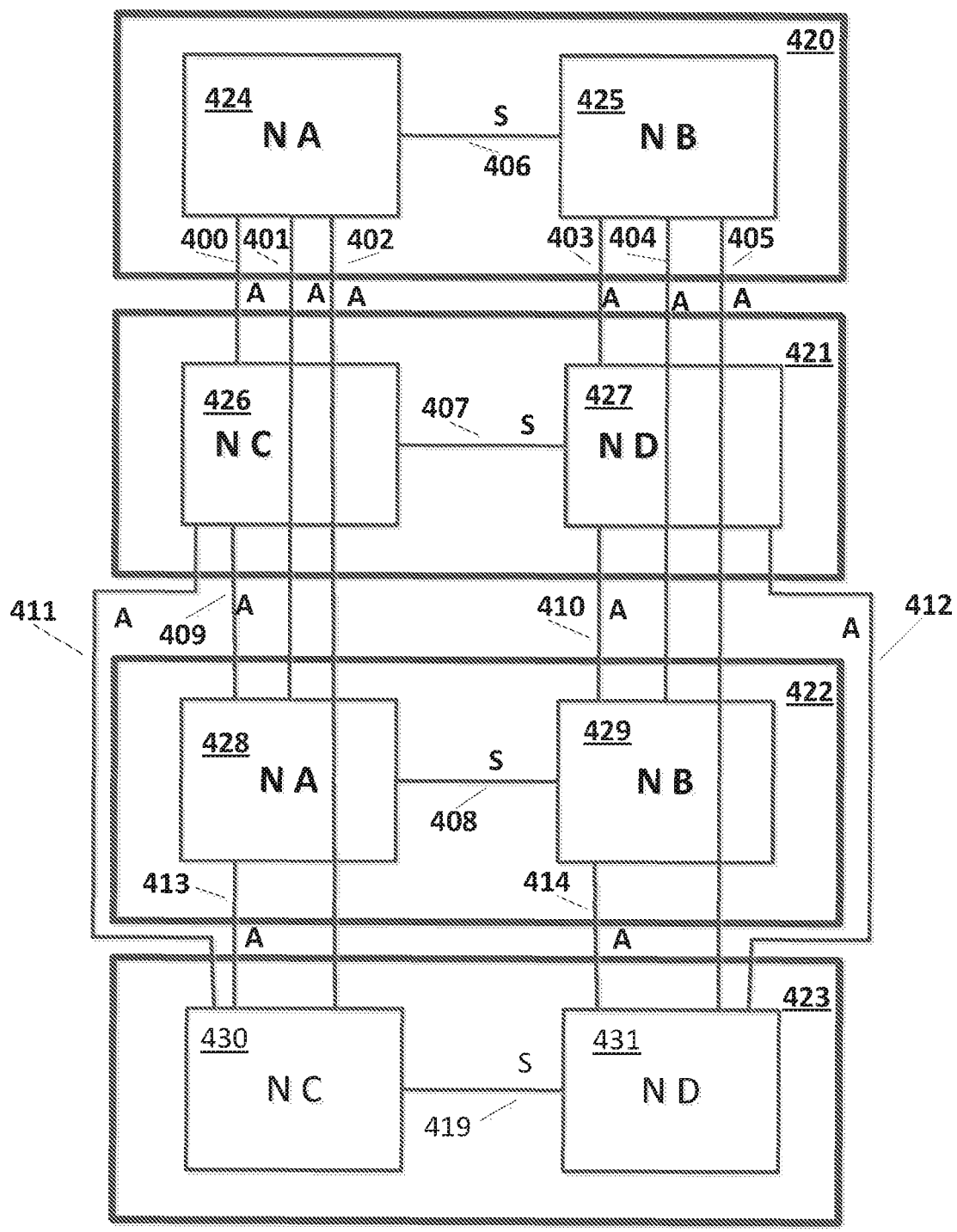
FIG. 4 illustrates one example of components of four drawers.

In an embodiment (FIG. 3), a system may comprise a plurality of drawers 309, 310, each node of a drawer 309, 310 may be communicatively coupled by a respective S-Bus 301, 302 within respective drawer. Preferably, each node of drawer 305, 306 is communicatively coupled with a node 307, 308 of another drawer 310 by way of an A-Bus. Intra node coherency communication may be performed in an embodiment using pass-thru and a combination of S-Bus and A-Bus links. Preferably (FIG. 4), separate A-Buses 400 to 405 and 409 to 414 are provided between nodes 424 to 431 of each drawer of a configuration, and on drawer nodes 424, 426, 428, 430 are communicatively coupled to other node(s) 425, 427, 429, 431 of the respective drawer via a corresponding on-drawer S-Bus 406 407, 408, 419. In an embodiment, nodes of a drawer may act as pass-thru paths for drawer to drawer communication. In such an embodiment, only one set of drawer to drawer A-Busses are needed 400, 401, 402 and function provided by a second set of A-Busses 403, 404, 405 is provided by a node 424, 426, 428, 430 passing communications from the single set of A-Busses 400, 401, 402 of each drawer through respective S-Busses 406, 407, 408, 419 to other node(s) 425, 427, 429, 431.

Preferably, buses used to communicatively couple elements (clusters, nodes, drawers) are provided for direct communication. Thus, each element has a direct link to each other element. In another embodiment, one or more elements are communicatively coupled by providing a pass-thru function at an element to reduce the number of busses required. Buses may be unidirectional pairs (FIG. 9 CP1 900 REC-X DRV-X pair for example), common bidirectional protocol or multi-drop busses for example.

Figure 9:
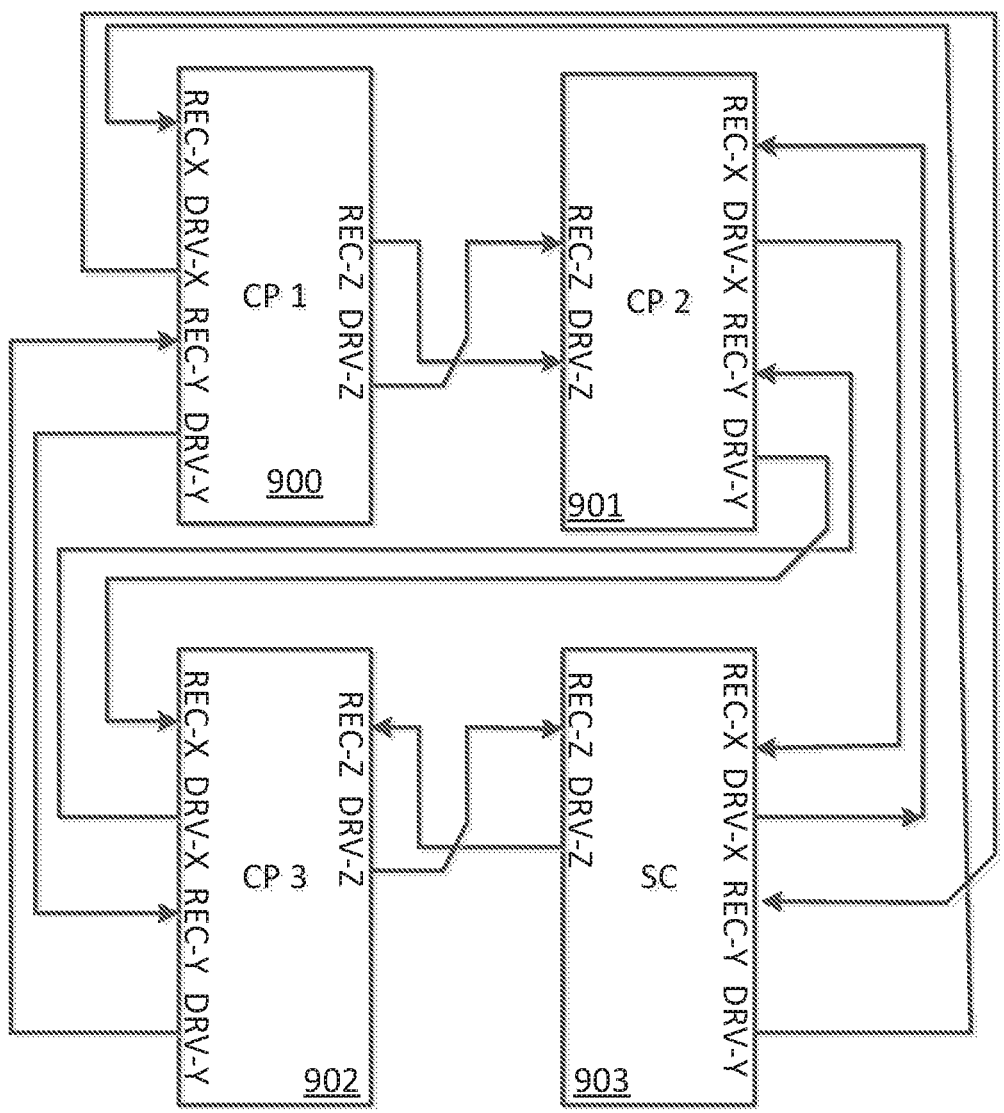
FIG. 9 depicts an example CP interconnection.

FIG. 9 depicts an example interconnection of clusters 900 to 902 and an SC 903. Each element (chip die) having three pairs (X, Y and Z) of unidirectional buses (REC-X DRV-X, REC-Y DRV-Y and REC-Z DRV-Z). In this cluster confirmation, each element has a direct connection with each of the other elements of the cluster.

In an embodiment, cache coherency amongst processors is performed across the cache hierarchy at the lowest level, to improve performance and minimize interference. Thus for example, when possible, only cache coherency operations of caches of a cluster that need access to caches of other clusters, may access other clusters, only cache coherency operations of caches of a node that need access to caches of other nodes may access other nodes and only cache coherency operations of caches of a drawer that need access to caches of other drawers may access other drawers for example.

In an embodiment, cache lines that are owned or shared by processors of an entity at a level of coherency (cluster, node, drawer) are candidates to be handled at the level of coherency. Thus, if a processor of the entity requests ownership or sharing of a line that is already owned by a processor of the entity, the entity need not access other entities to handle the request coherently. Furthermore, if a processor of an entity requests sharing of a line owned or shared by a processor of the entity need not access other entities to handle the request. A request, for example, by a processor of node A 424 (FIG. 4), for sharing of a cache line is examined by SC function to determine if the line is owned or shared by a processor of Node A. If it is already owned or shared, the SC handles the request within the node without accessing any other node. If the line is neither owned nor shared by a processor of Node A, the SC of Node A performs a cache coherency operation with other nodes 425 to 431. In an embodiment, in such a scenario, certain Node coherency operations may speculatively broadcast the request to other nodes before determining that the line is shared or owned by a processor of Node A. In that case, the other nodes may examine their coherency state for the cache line for example before being required to actually participate in the coherency operation. The speculative request may later be cancelled or time out if the requesting node discovers it is not needed.

Embodiments interlock a plurality of cache coherency networks where each network has its own point of coherency. Having multiple points of coherency allows us to optimize both protocols to minimize the number of node to node hops required to establish coherency, but requires that the protocols be tailored to allow for a method to resolve coherency when conflicts arise between them. The protocols may be nested. A nested protocol may resolve cache coherency operations within the requestors node when possible, and only invoke the global protocol when coherency operations effect other nodes.

A cache coherency protocol defines a set of states that cache data can exist in and a set of rules for maintaining data integrity between distributed caches in a SMP system. MESI and MOESI are examples of well-known cache coherency protocols. Within these protocols for example, data can exist in a shared state where multiple caches each have a copy of the cache data, and exclusive state where only a single cache has a copy of the data or an invalid state where no cache has a copy of the data.

An important subset of the rules of any cache coherency protocol are the methods used to establish ordering when multiple processors of the SMP system simultaneously attempt to access the same cache data. These simultaneous cache accesses may also be known as a conflict and the methods for resolving these conflicts have a significant influence on the coherency protocol design.

In order to resolve these coherency conflicts, all attempts to access cache data need to have a common location used to assign an order to the multiple cache accesses. This common location is known as the point of coherency in the protocol. There are many ways to establish the point of coherency in a protocol, common methods that will be recognized by one skilled in the art include directory based coherency protocols and snoop based coherency protocols. Once a point of coherency is identified in a protocol, requests to change the state of a cache entry must first obtain permission to do so by checking with the point of coherency in a process known as establishing coherency. If there are no other active operations to a cache entry when a request checks the point of coherency, then the request may modify the cache entry. Subsequent requests to modify the same cache entry by other processors in the system will be notified of a coherency conflict by the point of coherency and required to wait their turn to modify the cache entry. When several requests are made to the same point of coherency, only one request may be accepted and the others rejected in an embodiment.

In a contemporary large SMP system, a single chip may contain multiple processors connected together via shared internal bus. Several such chips may be packaged and connected together in structure known herein as a node. Multiple nodes are then connected together to create the large SMP system. Communication between processors in such a system requires messages to be passed across multiple connections between chips and nodes. The number of connections that must be traversed between two processors may also be referred to as a number of chip or node hops. A large SMP system may also have a cache hierarchy, for example, each processor core of a chip may have one or more caches for caching cache lines for access by the processor. The chip may have a non-inclusive cache for caching cache lines accessible by all processors of the chip. A node may have yet a higher level cache for caching cache lines accessible to all processors of the node for example. All of the caches must maintain coherency of cache data of the cache hierarchy according to the design of the node(s).

In an example computer configuration, at least two interlocked coherency networks may be employed. For example, a first protocol may be used for the on-node local cache coherency fabric and another for the node-to-node (global) cache coherency fabric. In this context, the local fabric includes the connections between multiple chips packaged together on the same node and the protocol used to maintain coherency between the caches on these chips. The global fabric here includes the connections between the different nodes in the system and the protocol used to maintain coherency between nodes. In an embodiment, the protocol used by the chips on the local fabric is distinct from the protocol used by the nodes on the global fabric. The transfer of cache data from the local fabric to the global fabric may require the two protocols to coordinate some accesses to a cache line.

The on-node local fabric, (FIG. 1), in an embodiment, may consist of up to four fully connected chips 109 to 112. These chips may consist of one storage control (SC) chip 112 and one to three central processor (CP) chips 109 to 111. A CP chip 500 (FIG. 5) may contain a plurality of processor cores 501 to 506, each with one or more private cache levels (L1/L2). It also may contain a large, shared cache level (L3) 508 that is shared by all of the processor cores 501 to 506 on the CP chip. In an embodiment, the processor cores on the CP chip may each have a private, two level cache hierarchy (level 1 and level 2 (L1/L2)) and a shared third level cache (level 3 (L3)) 508.

The SC chip contains a large, shared cache level, which functions as a fourth level (L4) cache in the present example. In addition to being connected to the three CP chips of the local fabric, the SC chip provides connections to other SC chips in the system via the global fabric.

In an embodiment, a fully configured system (FIG. 4), may consist of up to eight of these nodes 424 to 431. The nodes are inter-connected in a two level structure. A pair of nodes 424 to 425, may be interconnected in a package referred to herein as a drawer. The connection between node pairs may be known as the S-Bus herein. The full system may contain up to four such drawers 420 to 423. Each drawer (520 for example) may be interconnected by, for example, a pair of connections 400 403, 401 404, 402 405 to every other drawer. These connections referred to herein as A-Buses. Collectively the S-Bus and A-Bus connections are referred to herein as the global fabric. Communication on the global fabric preferably sends messages on both the S-Bus and A-Bus. For example, for a node 424 to send a message to another node 431, the message may first be sent on S-Bus 406 to another node 425 and the other node 425 may act as a pass-thru node for the signal and forward the message on its A-Bus 409 connection to the final node 431.

In embodiments, two points of coherency are defined, the Local Intervention Master and the Global Intervention Master. In an example, for any cache line that exists in the local fabric, the last chip to install the cache line (cast-in) may be marked as the Local Intervention Master (LIM) and serve as the point of coherency on the local fabric for that cache line. Similarly, on the global fabric, the last node to install the cache line may be marked as the Global Intervention Master (GIM) and may serve as the point of coherency for the cache line on the global fabric. In an embodiment, a separate inclusive directory is maintained for each installed line for each of the LIM and GIM. In another embodiment a single distributed inclusive directory is maintained cooperatively across all nodes.

In an embodiment, when a processor request for a cache line by one of the CP chips 109 misses its local cache, it may broadcast its request to the other chips 110 to 112 on the local fabric. The other two CP chips 110 to 111 and SC 112 chip may each snoop their respective cache directories and then broadcast the state of the cache line to the other (CP, SC) chips on the local fabric. If the line exists in one or more of these chip caches, one chip may be tagged as the LIM chip for the cache line. The LIM chip may serve as the point of coherency on the local fabric for the cache line and may be responsible for returning data to the requesting CP chip 109. At the end of the operation, the requesting CP chip may become the new LIM chip for the cache line.

In an embodiment, if the requested cache line does not exist in any of the CP 109 to 111 or SC chip 112 caches on the requesting CP chip's local node, then the SC chip may broadcast the request onto the global fabric. The global fabric broadcast (FIG. 4) from a first node 424 for example, may be sent on both the three A-Bus link(s) 400 to 402 and the S-Bus link 406 connected to the SC chip 500. The SC chip 500 of nodes 426, 429, 430 that receive the broadcast on the A-Bus link may forward the broadcast on respective S-Bus links 407, 408, 409. In this manner, the broadcast may be sent from a node to all the other (remote) nodes in the system. The SC chip 500 on each remote node may check the state of the line on the respective node by snooping the SC inclusive directory of the node. Each node may return the state of the line in that node to the requesting node. Because each SC directory keeps track of all valid lines on the node (inclusive directory), the resolution of coherency on the global fabric can be done without requiring an operation to be broadcast on the local fabric of the remote nodes. The SC chip directory of a node may have full knowledge of all lines that exist on the node. This minimizes the hops (and resulting interference and delay) needed to resolve coherency on the global fabric, as the SC may not need to check with the CP chips for the state of the line. In an embodiment, only cache line coherency operations that can't be resolved at a requesting node are broadcast to other nodes, thus reducing interference and delay that may be encountered in global accesses.

However, allowing the global fabric coherency to be resolved without broadcasting on the local fabric may require an interlock between global fabric operations and local fabric operations on the node to handle the case when a global fabric request conflicts with a local fabric request. To resolve these conflicts, the SC chip of a node may serve as the point of coherency for all local fabric requests. This gives it the ability to reject local fabric operations if there is an active global fabric operation without accessing the local fabric.

For example, a CP chip 109 of a node 424 may broadcast a request on the local fabric 100 101 102. When that request snoops the LIM chip of the line, it may find that there are no other active requests for the cache line and it may be able to at least partially establish coherency on the local fabric. When the same request snoops the SC chip 112, if it conflicts with an active global fabric request for the same line, the SC chip will preferably reject the local fabric request for the cache line. This reject overrides the partial coherency that was established at the LIM chip. Once the LIM chip has been notified of the request reject by the SC, it may release any partial coherency that had been established. After the requesting CP chip 109 receives the reject from the SC 112 of the requesting node 424, it will rebroadcast the request on the local fabric 103 to 105. This reject and rebroadcast sequence may occur multiple times while a global fabric request is active for a cache line. Once the global fabric request that is triggering the conflict completes, the CP's local fabric request at the node 424 may be accepted by the SC chip 112 of the node 424 and allowed to proceed.

In an embodiment a first level coherency protocol in the tiered system structure is provided, referred to herein as the local fabric interconnect. In an embodiment, the local fabric connects up to four chips 109 to 112 together via a high speed elastic interface called the X-Bus 100 to 105. The four chips consist of one to three CP chips 109 to 110, each with six processor cores and a large shared level 3 (L3) cache, and one SC chip 112 with a large shared level 4 (L4) cache. Collectively these four chips may be packaged together as a node.

The primary coherency point in the local fabric protocol for a cache line may be the chip that is designated as Local Intervention Master (LIM). The LIM chip may be the last chip on the node to install the cache line in its cache. It may source the data when another chip on the node requests it. In the case where none of the chips on the node have the cache data, the SC chip 112 may broadcast the cache line request on the second level of the tiered structure known as the global fabric.

A cache request may begin with a broadcast from the requesting chip, CPA 109 (FIG. 1) for example, to the other chips 111 to 112 it is connected to on its connections of the X-Bus 100, 101, 102. When CPB 110, CPC 111 and the SC 117 receive the broadcast from CP0 109, they may each perform a directory snoop and then broadcast the results of that snoop to the other chips 109 to 112 on the X-Bus 100 to 105 in a message called a partial response (PRESP). For example, CPB 110 may send the results of its snoop to CPA 109, CPC 111 and the SC 112 on its connections 101, 104, 105 of the X-Bus. This message distribution means that each chip on the X-Bus receives PRESPs from all the other chips on the X-Bus and allows each chip to calculate the coherency result (CRESP) independently. As a result each chip knows the CRESP after only two message hops.

In an embodiment (FIG. 2), each logical node 201 is assembled on a card (aka drawer) that is shared by another node 202. Collectively, a card and the two logical nodes that it contains are known herein as a drawer. The two nodes of a drawer are also known herein as sibling nodes. Sibling nodes may be interconnected through the SC chip 112 on each respective node by high-performance elastic interfaces referred to as S-Buses (FIGS. 4, 406 to 408, 419).

In an embodiment, each drawer may have off-drawer differential cable connections that allows the system to scale from a 48-way, single-drawer system up to a 192-way, four-drawer system for example. The cable connections between drawers may be referred to as A-buses 401 to 405.

An operating sequence on the global fabric begins with an address broadcast from the home node on the S-Bus and A-buses. The S-Bus broadcast is received by the sibling node, which performs a directory snoop on the SC chip and returns a partial response (PRESP) to the home node. The A-Bus broadcasts are received by the Pass-Thru Nodes, which forward the broadcast across their S-Bus connection to the Leaf Nodes, as well as performing a SC directory snoop. The leaf node behavior is similar to the sibling node, a SC directory snoop is performed and a PRESP is returned to the pass thru node. The pass thru node collects the PRESP from the leaf node and merges it with the results of its own directory snoop and returns the merged result to the home node. The home node collects all of the partial responses and generates a Combined Response (CRESP) that reflects the state of the request in the system. The CRESP is then broadcast in a manner similar to the initial address broadcast to all the nodes in the system.

An important feature of the present disclosure is that the PRESP generated by the sibling, pass-thru and leaf nodes is done only by snooping the SC directory. The SC directory indicates which lines the CP owns and so it is not necessary to snoop the CP directories to generate the PRESP on the global fabric. This saves time in establishing coherency on the global fabric by eliminating the delay in snooping the CP chip. However, it requires new interlocks between global fabric requests and local fabric requests from the CP to resolve coherency between them.

The foundation of the interlock of the between global fabric and local fabric is accomplished by allowing global fabric operations to reject local fabric operations after they have established coherency on the local fabric. Once a global fabric operation has returned a PRESP, it will set a special pending state on the SC chip. A local fabric request that subsequently arrives on the SC chip will detect a conflict against the global fabric request and as a result the SC chip will generate a reject PRESP on the local fabric. As a result of this reject PRESP, the requesting CP chip on the local fabric will know that there was a conflict with a global fabric operation and will retry the local fabric operation.

Figure 10:
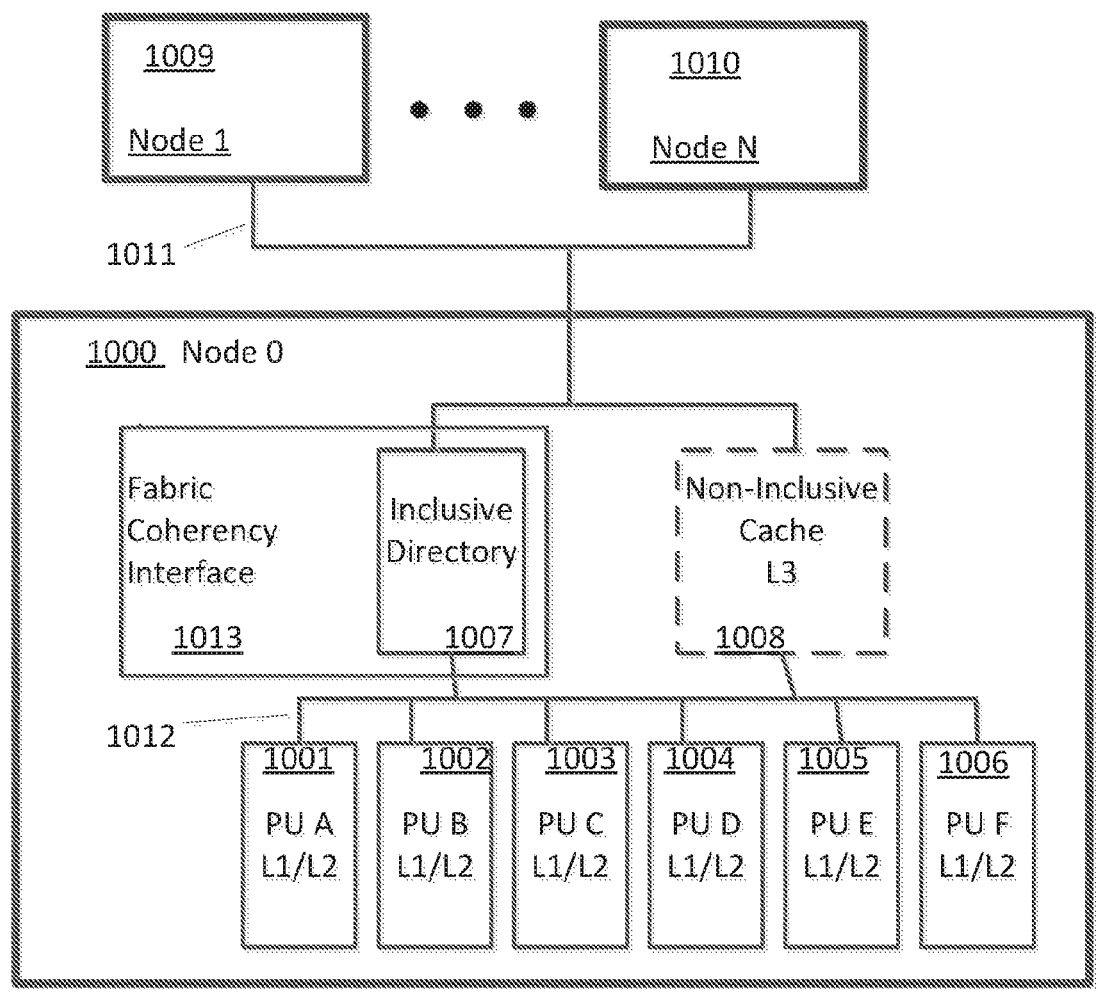
FIG. 10 depicts an example node configuration.

Referring to FIG. 10, an example embodiment is shown. A system may comprise a plurality (N) nodes 1000, 1009 to 1010, including Node 0 1000. Each node 1000, 1009 to 1010 may be communicatively coupled by a bus structure 1011. The bus structure may be selected from any of a wide variety of bus structures that best suits the design tradeoffs, including multi-drop or point to point buses. Each node may have a shared bus with other nodes or may have a unique path to each other node. Each node including Node 0 1000 may comprise a plurality of processors 1001 to 1006 and a hierarchy of caches (processor caches L1 and L2, and optional non-inclusive shared cache L3 1008 shared by all processor caches of the node for example), and communicatively coupled 1012 within the respective node by any of a variety of means. The L3 cache 1008 may be non-inclusive in that it may provide cache lines to the processor caches (L1/L2) but may not retain copies of all cache lines held in the processor caches.

Each node may include Fabric coherency interface (FCI) logic 1013 for coordinating coherency operations between fabrics of a tiered coherency implementation having a local fabric 1012 and a global fabric 1011. Each Fabric coherency interface logic 1013 may also include an inclusive directory 1007 that keeps track of at least all lines in the caches of the respective node including processor caches of the node. When a processor cache access coherency operation can be performed by the caches of the node without accessing other nodes, it is said in this disclosure the coherency operations are local cache coherency operations. When a processor cache access coherency operation needs to access cache state of other nodes, it is known in this disclosure as a global cache coherency operation. Logic 1013 on each node utilizes the respective inclusive directory 107 as a point of coherency for the respective node. The inclusive directory FCI logic 1013 performs an SC function and determines if a coherency operation is to be local or global. When a global coherency operation is performed, each node's inclusive directory determines if the request needs to effect local cache coherency, for example, the inclusive directory may determine that the requested line is not held by any cache of the node, or that the requested cache line is in a shared state and can be provided by the L3 cache 1008 of the node. In either case, no local fabric coherency operation (local fabric snoop) may be required of processor caches for example. In FIG. 10, buses are shown as a single line in order to simplify the drawing. Other interconnections, known in the art, may be employed, including bidirectional busses, point to point unidirectional buses and the like.

In an embodiment, the directory of the non-inclusive cache (L3 1008) cache may be implemented as a portion of the inclusive cache directory 1007.

In an embodiment, FCI logic 1013 interlocks global fabric coherency requests with local fabric coherency requests wherein simultaneous global fabric coherency requests and local fabric coherency requests to the same line are detected by the FCI logic 1013 which may reject the local fabric coherency request of a processor of the node. Conflicting local fabric coherency requests to the cache line continue to be rejected until the global fabric coherency request is responded to, at which time, later local fabric coherency requests to the cache line may be honored. The FCI logic 1013 may include logic to determine if a local fabric coherency request can be honored without involving a global fabric coherency operation. The logic may determine this according to a predetermined plan (Reference Table 1) where an I state indicates the cache line is invalid or not cached. The embodiment may allow the node to handle any sort of local cache line request to local cache lines that are in the M or E state. The embodiment may additionally allow local SR requests to local cache lines in the S state and further allow local IR requests to local cache lines that are in the S or I state, as they can be handled within the node without requiring a global fabric coherency operation.

TABLE 1

| Local Request$_{(R)}$ | $M_R$ | $E_R$ | $S_R$ | $I_R$ |
| --- | --- | --- | --- | --- |
| M | Y | Y | Y | Y |
| E | Y | Y | Y | Y |
| S | N | N | Y | Y |
| I | N | N | N | Y |

In the embodiment, the FCI logic 1013 of a node may handle global fabric coherency operations, initiated by another node, using logic described in Table 2. In the embodiment, the FCI logic 1013 of each node receives a request and determines if it can be handled without a local fabric coherency operation of the node. Any global request can be handled without a local fabric coherency operation if the line is invalid or not installed (I) at the respective node. In an embodiment, if an SR global request is received and the line is held in an S state, the line can be shared by the L3 cache without a local fabric coherency operation. In another embodiment, a shared (S) cache line of a node is not provided to the global fabric requestor if the node determines that the cache line is being provided by another node.

TABLE 2

| Global Request$_{(R)}$ | $M_R$ | $E_R$ | $S_R$ | $I_R$ |
| --- | --- | --- | --- | --- |
| M | N | N | N | N |
| E | N | N | N | N |
| S | N | N | Y | N |
| I | Y | Y | Y | Y |

Figure 11:
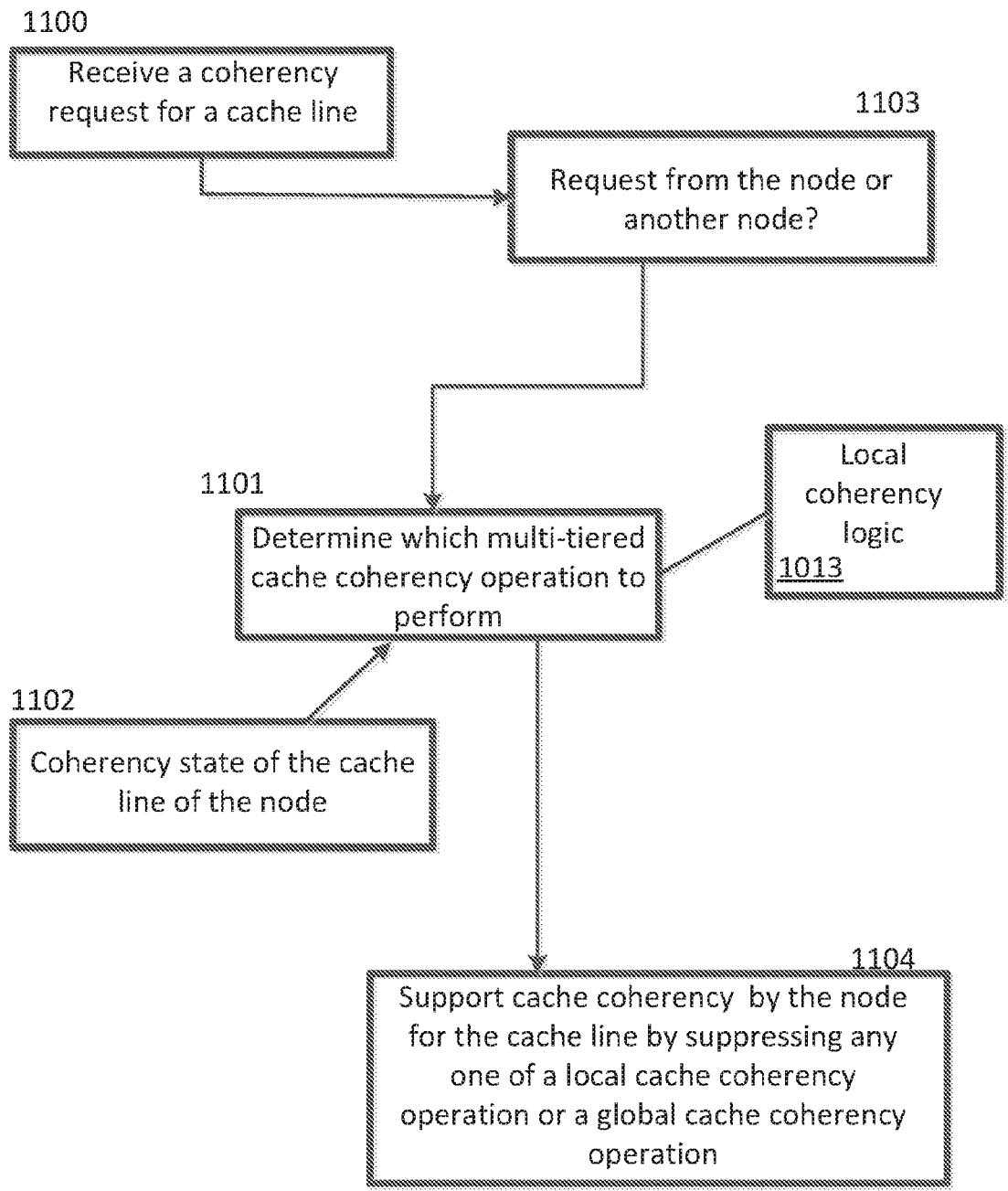
FIGS. 11-13 depicts example operations of embodiments.

In an embodiment (FIG. 10), cache coherency is provided in a processor system comprising a plurality of nodes 1000, 1009, 1010, each node comprising a respective plurality of processors (PU A 1001, PU B 1002, PU C 1003, PU D 1004, PU E 1005, PU F 1006) and a respective cache system (L1/L2 1001, L1/L2 1002, L1/L2 1003, L1/L2 1004, L1/L2 1005, L1/L2 1006), the processor system configured to perform a multi-tiered cache coherency protocol, the multi-tiered cache coherency protocol comprising local cache coherency operations within a node 1012, and global cache coherency operations between nodes 1011, the method comprising: based on receiving (FIG. 11) 1100 a coherency request for a cache line, determining 1101, by local coherency logic 1013 of a node 1000, which multi-tiered cache coherency operation to perform; and based on the coherency state 1102 of the cache line at the node and the request being from the same node 1000 or another node 1009, 1010, supporting 1104, by the node 1000, cache coherency for the cache line by suppressing any one of a local cache coherency operation or a global cache coherency operation.

Figure 12:
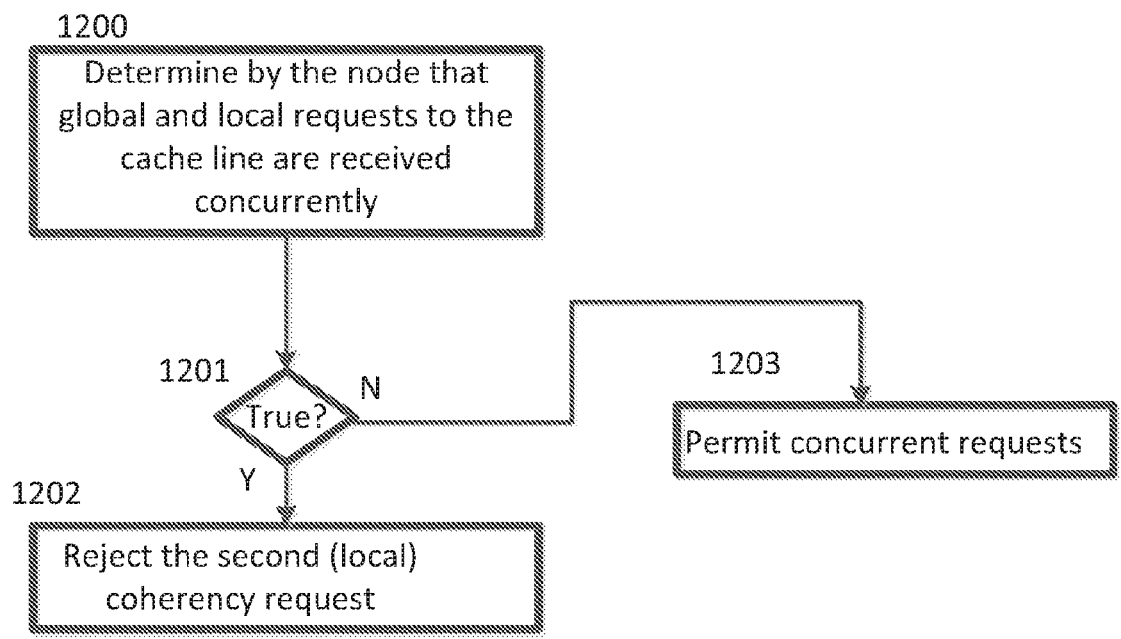

In an embodiment (FIG. 12), concurrent on-node and off-node coherency requests are interlocked, the interlocking comprising: based on determining 1200, by the node 1000, that concurrent requests to the cache line are received concurrently 1202, the concurrent requests comprising the coherency request and another coherency request wherein a first request of the two requests is from another node 1009 to 1010 and a second request of the two requests is from a processor of the node 1000, rejecting 1202 the second request. Otherwise, permitting 1203 coherency requests In an embodiment, local coherency logic 1013 at a node 1000 maintains 1007 state information for all cache lines of the node, the node using the local coherency logic for determining which multi-tiered cache coherency operation to perform.

Figure 13:
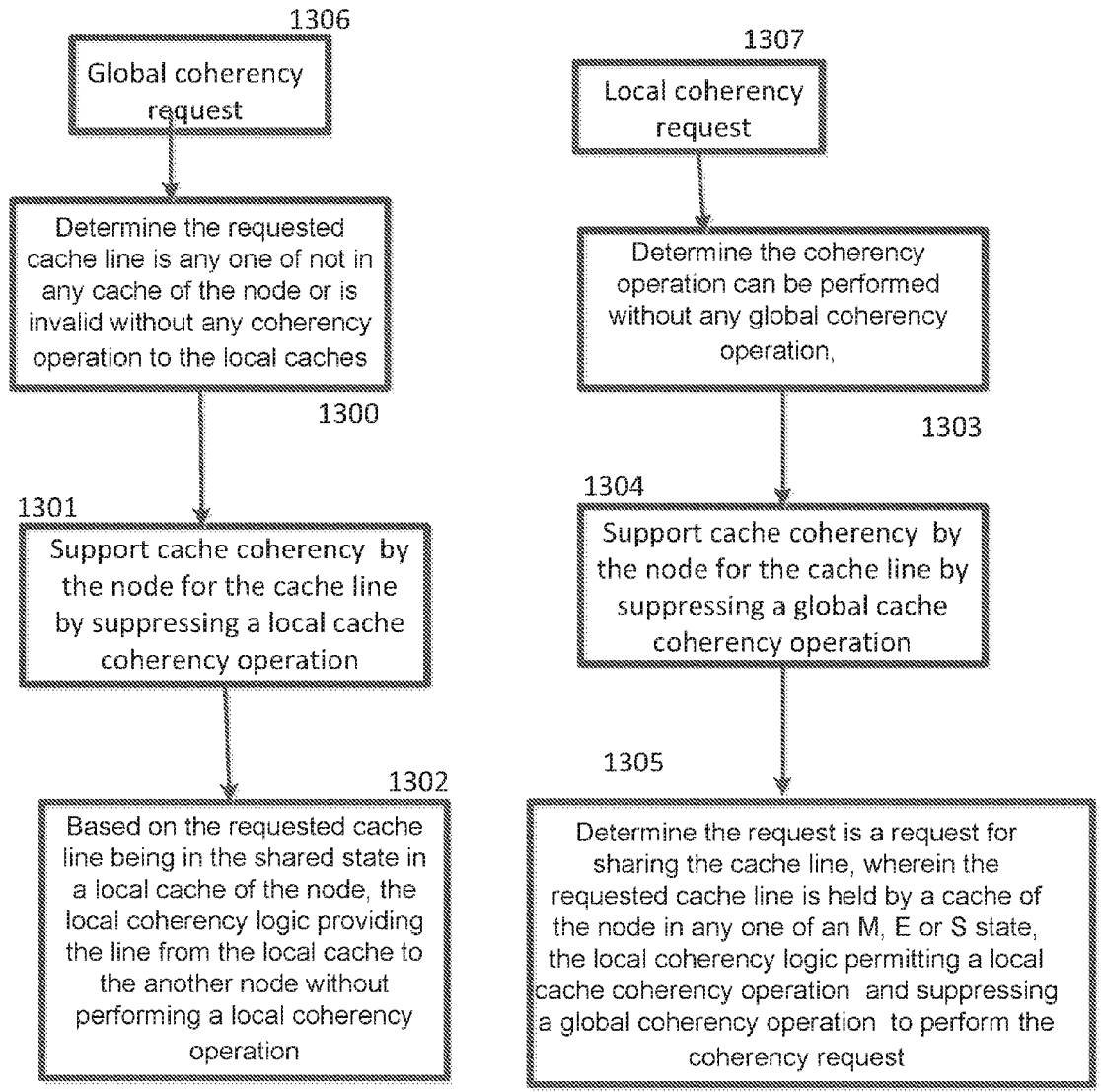

In an embodiment, the coherency request is a global coherency operation (FIG. 13) 1306 from another node 1009, 1010, wherein the local coherency logic 1013 of the node 1000 determines 1300 the requested cache line is any one of not in any cache of the node 1000 or is invalid without any coherency operation to the local caches, the local coherency logic 1013 suppressing 1301 the local coherency request.

In an embodiment, the coherency request is a local coherency operation 1307 from a processor cache of the node 1000, wherein the local coherency logic 1013 of the node 1000 determines 1303 the coherency operation can be performed without any global coherency operation, the local coherency logic 1013 suppressing 1304 a global coherency operation to perform the coherency request.

In an embodiment, the coherency request is a global coherency operation 1306 from another node 1009, 1010, wherein local coherency logic 1013 of the node 1000 determines the request is for sharing the cache line, wherein the requested cache line is in the shared state in a local cache of the node 1000, the local coherency logic providing 1302 the line from the local cache to the another node 1009, 1010 without performing a local coherency operation 1012.

In an embodiment, the coherency request is a local coherency operation 1307 from a processor cache of the node 1000, wherein the local coherency logic of the node determines 1305 the coherency request 1307 is a request for sharing the cache line, wherein the requested cache line is held by a cache of the node 1000 in any one of an M, E or S state, the local coherency logic permitting a local cache coherency operation 1012 and suppressing a global coherency operation 1011 to perform the coherency request.

Figure 1:
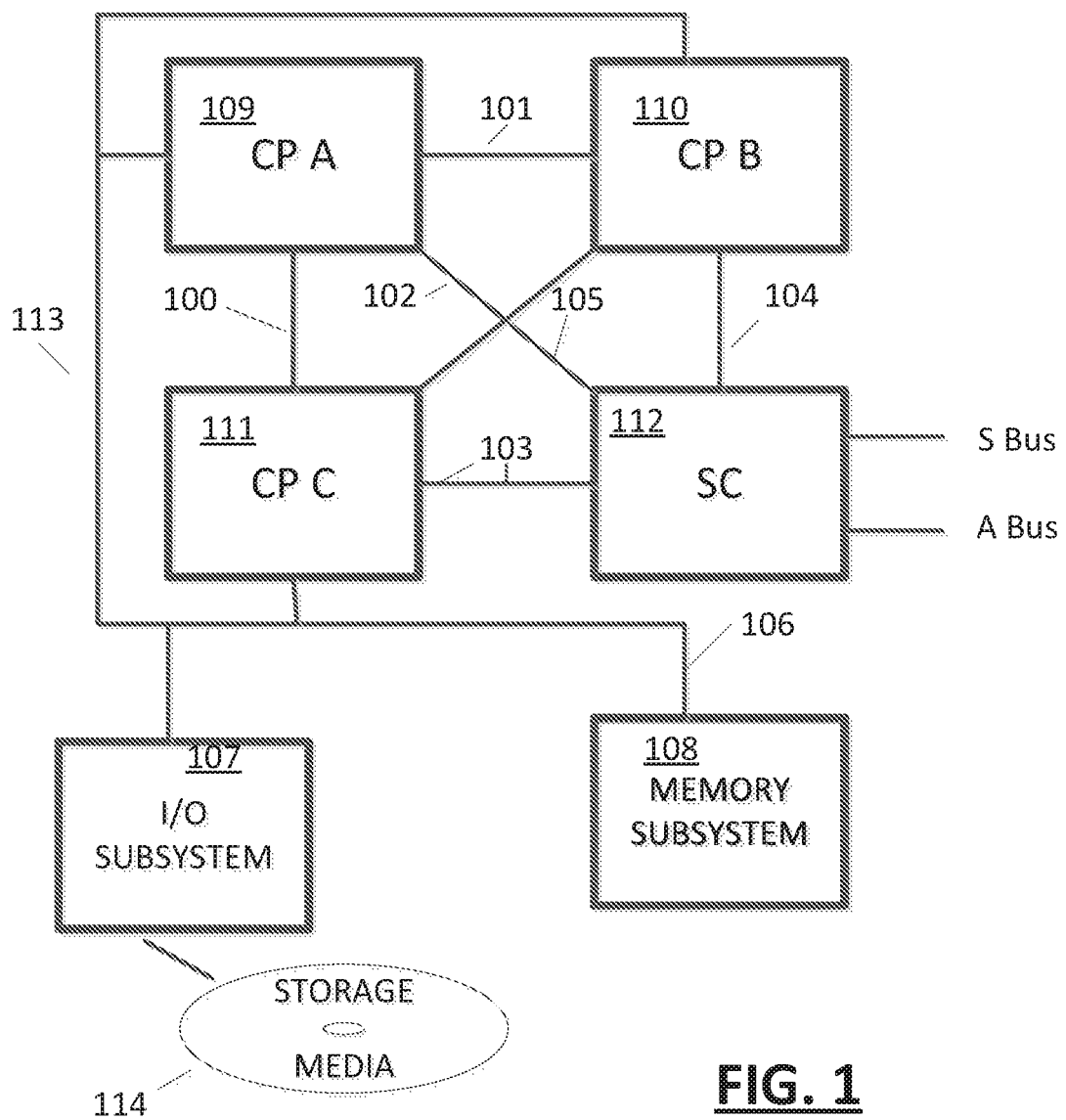
FIG. 1 illustrates one example of components of a node.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for maintaining cache coherency in a processor system comprising a first node, the first node comprising a first plurality of central processor (CP) clusters, each CP cluster comprising a second plurality of processors, each CP cluster having a respective local cache shared by processors of a respective CP cluster, the processor system configured to perform a multi-tiered cache coherency protocol, the multi-tiered cache coherency protocol consisting of any one of local cache coherency operations within a node and global cache coherency operations between nodes, wherein cache coherency operations consist of any one of finding a cache line, obtaining the cache line and updating coherency state of the cache line, the computer implemented method comprising:

for each cache line installed in a CP cluster of a node, designating one CP cluster of the node as a local intervention master (LIM) CP cluster for a respective cache line, the LIM CP cluster of the respective cache line being the CP cluster of the node having a most recently installed copy of the respective cache line, wherein the LIM CP cluster of the respective cache line is a designated point of coherency for the respective cache line;

initiating a first cache request for access to a first cache line, by a first processor of a first CP cluster of the first node;

based on the first cache line being not available in a local cache of the first CP cluster, broadcasting the first cache request, over a local fabric, to other CP clusters, the other CP clusters comprising a local intervention master (LIM) CP cluster of the first cache line;

based on the first cache request, performing a first cache coherency operation, between the first CP cluster and a designated LIM CP cluster of the first cache line;

based on the first cache coherency operation causing the first cache line to be installed in a local cache of the first CP cluster, designating, by the processor system, the first CP cluster as LIM CP cluster of the first cache line;

for each cache line installed in a node, designating one node as a global intervention master (GIM) node for a respective cache line, the GIM node of a respective cache line being the node having a most recently installed copy of the respective cache line, wherein the GIM node of the respective cache line is a global point of coherency for the respective cache line in a global fabric;

based on the first cache line not existing in any cache of the first node, broadcasting, by a first storage control (SC) function of the first node, the first cache request over a global fabric to other SC functions of other nodes, the other SC functions comprising a GIM SC function;

based on a second SC function of a second node being the GIM SC function of the first cache line, sending, by the second SC function, the broadcast first cache request to the LIM CP cluster of the first cache line of the second node; and based on the second SC function not being the GIM SC function, not sending the broadcast first cache request to any CP cluster of the second node.

2. The computer implemented method according to claim 1, further comprising:

receiving from a third CP cluster, by the first CP cluster, a second cache request for a second cache line;

based on the first CP cluster being a LIM CP cluster of the second cache line, sending, by the first CP cluster, the second cache line to the third CP cluster; and based on the sending the second cache line to the third CP cluster, causing the third CP cluster to be the LIM CP cluster of the second cache line.

3. The computer implemented method according to claim 1, wherein each SC function comprises an all-inclusive directory and a fabric control interface (FCI) function, the all-inclusive directory having an indication of all valid cache lines of a respective node, wherein coherency operations utilize the SC function, wherein each SC function is configured to be a GIM of a cache of the respective node.

4. The computer implemented method according to claim 3, wherein the all-inclusive directory of the respective node is configured to identify all cache lines of all caches of the respective node, wherein the first node of the processor system determines whether a requested cache line is held in caches of the first node by interrogating only the all-inclusive directory of the SC function of the first node and not interrogating respective caches of CP clusters of the first node.

5. The computer implemented method according to claim 4, wherein the all-inclusive directory of a node is interrogated to determine whether to provide a cache request from another node to CP clusters of the node.

6. The computer implemented method according to claim 1, wherein the first cache request is broadcast to other CP clusters and to the SC function to locate a LIM CP of the cache line, wherein the SC function of a node is the point of coherency for all local fabric requests of the node, the method further comprising:
rejecting by the SC function of the first node, a local fabric operation for the cache line, from a processor of the first node, based on a global fabric operation for the same cache line of the first node being active from another node.

7. The computer implemented method according to claim 1, wherein the first node comprises one or more CP clusters and an SC function interconnected by a local fabric, wherein cache requests from a CP cluster of the first node are broadcast to all other CP clusters of the first node and the SC function of the first node, wherein, in response to the broadcast cache request, each of said all other CP clusters of the first node send respective partial responses to other CP clusters and the SC function of the first node, and wherein, in response to the broadcast cache request, the SC function sends respective partial responses to the one or more CP clusters of the first node, wherein a global cache request is sent from the SC function of the first node to all other SC functions of other nodes, and wherein each of said all other SC functions respond with a partial response to the SC function of the first node to indicate whether they have the cache line without interrogating caches of CP clusters of the other nodes.

8. A computer system for maintaining cache coherency, the computer system comprising:
a first node comprising a first plurality of processor (CP) clusters, each CP cluster comprising a second plurality of processors, each CP cluster having a respective local cache shared by processors of a respective CP cluster, the processor system configured to perform a multi-tiered cache coherency protocol, the multi-tiered cache coherency protocol consisting of any one of local cache coherency operations within a node and global cache coherency operations between nodes, wherein cache coherency operations consist of any one of finding a cache line, obtaining the cache line and updating coherency state of the cache line, the computer system configured to perform a method comprising:
for each cache line installed in a CP cluster of a node, designating one CP cluster of the node as a local intervention master (LIM) CP cluster for a respective cache line, the LIM CP cluster of the respective cache line being the CP cluster of the node having a most recently installed copy of the respective cache line, wherein a LIM CP cluster of the respective cache line is a designated point of coherency for the respective cache line;
initiating a first cache request for access to a first cache line, by a first processor of a first CP cluster of the first node;
based on the first cache line being not available in a local cache of the first CP cluster, broadcasting the first cache request, over a local fabric, to other CP clusters, the other CP clusters comprising a local intervention master (LIM) CP cluster of the first cache line;
based on the first cache request, performing a first cache coherency operation between the first CP cluster and a designated LIM CP cluster of the first cache line;
based on the first cache coherency operation causing the first cache line to be installed in a local cache of the first CP cluster, designating, by the processor system, the first CP cluster as LIM CP cluster of the first cache line;
for each cache line installed in a node, designating one node as a global intervention master (GIM) node for a respective cache line, the GIM node of the respective cache line being the node having a most recently installed copy of the respective cache line, wherein the GIM node of the respective cache line is a global point of coherency for the respective cache line in a global fabric;
based on the first cache line not existing in any cache of the first node, broadcasting, by a first storage control (SC) function of the first node, the first cache request over a global fabric to other SC functions of other nodes, the other SC functions comprising a GIM SC function;
based on a second SC function of a second node being the GIM SC function of the first cache line, sending, by the second SC function, the broadcast first cache request to the LIM CP cluster of the first cache line of the second node; and
based on the second SC function not being the GIM SC function, not sending the broadcast first cache request to any CP cluster of the second node.

9. The computer system according to claim 8, further comprising:
receiving from a third CP cluster, by the first CP cluster, a second cache request for a second cache line;
based on the first CP cluster being a LIM CP cluster of the second cache line, sending, by the first CP cluster, the second cache line to the third CP cluster; and
based on the sending the second cache line to the third CP cluster, causing the third CP cluster to be the LIM CP cluster of the second cache line.

10. The computer system according to claim 8, wherein each SC function comprises an all-inclusive directory and a fabric control interface (FCI) function, the all-inclusive directory having an indication of all valid cache lines of a respective node, wherein coherency operations utilize the SC function, wherein each SC function is configured to be a GIM of a cache of the respective node.

11. The computer system according to claim 10, wherein the all-inclusive directory of the respective node is configured to identify all cache lines of all caches of the respective node, wherein the first node of the processor system determines whether a requested cache line is held in caches of the first node by interrogating only the all-inclusive directory of the SC function of the first node and not interrogating respective caches of CP clusters of the first node.

12. The computer system according to claim 11, wherein the all-inclusive directory of a node is interrogated to determine whether to provide a cache request from another node to CP clusters of the node.

13. The computer system according to claim 8, wherein the first node comprises one or more CP clusters and an SC function interconnected by a local fabric, wherein cache requests from a CP cluster of the first node are broadcast to all other CP clusters of the first node and the SC function of the first node, wherein, in response to the broadcast cache request, each of said all other CP clusters of the first node send respective partial responses to other CP clusters and the SC function of the first node, and wherein, in response to the broadcast cache request, the SC function sends respective partial responses to the one or more CP clusters of the first node, wherein a global cache request is sent from the SC function of the first node to all other SC functions of other nodes, and wherein each of said all other SC functions respond with a partial response to the SC function of the first node to indicate whether they have the cache line without interrogating caches of CP clusters of the other nodes.

14. A computer program product for maintaining cache coherency in a processor system comprising a first node, the first node comprising a first plurality of central processor (CP) clusters, each CP cluster comprising a second plurality of processors, each CP cluster having a respective local cache shared by processors of a respective CP cluster, the processor system configured to perform a multi-tiered cache coherency protocol, the multi-tiered cache coherency protocol consisting of any one of local cache coherency operations within a node and global cache coherency operations between nodes, wherein cache coherency operations consist of any one of finding a cache line, obtaining the cache line and updating coherency state of the cache line, the computer program product comprising a computer readable storage medium having program instructions embodied therewith, wherein the computer readable storage medium is not a transitory signal per se, the program instructions executable by a computer processor to cause the computer processor to perform a method comprising:
    for each cache line installed in a CP cluster of a node, designating one CP cluster of the node as a local intervention master (LIM) CP cluster for a respective cache line, the LIM CP cluster of the respective cache line being the CP cluster of the node having a most recently installed copy of the respective cache line, wherein a LIM CP cluster of the respective cache line is a designated point of coherency for the respective cache line;
    initiating a first cache request for access to a first cache line, by a first processor of a first CP cluster of the first node;
    based on the first cache line being not available in a local cache of the first CP cluster, broadcasting the first cache request, over a local fabric, to other CP clusters, the other CP clusters comprising a local intervention master (LIM) CP cluster of the first cache line;
    based on the first cache request, performing a first cache coherency operation, between the first CP cluster and a designated LIM CP cluster of the first cache line;
    based on the first cache coherency operation causing the first cache line to be installed in a local cache of the first CP cluster, designating, by the processor system, the first CP cluster as LIM CP cluster of the first cache line;
    for each cache line installed in a node, designating one node as a global intervention master (GIM) node for a respective cache line, the GIM node of the respective cache line being the node having a most recently installed copy of the respective cache line, wherein the GIM node of the respective cache line is a global point of coherency for the respective cache line in a global fabric; and
    based on the first cache line not existing in any cache of the first node, broadcasting, by a first storage control (SC) function of the first node, the first cache request over a global fabric to other SC functions of other nodes, the other SC functions comprising a GIM SC function;
    based on a second SC function of a second node being the GIM SC function of the first cache line, sending, by the second SC function, the broadcast first cache request to the LIM CP cluster of the first cache line of the second node; and
    based on the second SC function not being the GIM SC function, not sending the broadcast first cache request to any CP cluster of the second node.

15. The computer program product according to claim 14, further comprising:
    receiving from a third CP cluster, by the first CP cluster, a second cache request for a second cache line;
    based on the first CP cluster being a LIM CP cluster of the second cache line, sending, by the first CP cluster, the second cache line to the third CP cluster; and
    based on the sending the second cache line to the third CP cluster, causing the third CP cluster to be the LIM CP cluster of the second cache line.

16. The computer program product according to claim 14, wherein each SC function comprises an all-inclusive directory and a fabric control interface (FCI) function, the all-inclusive directory having an indication of all valid cache lines of a respective node, wherein coherency operations utilize the SC function, wherein each SC function is configured to be a GIM of a cache of the respective node.

17. The computer program product according to claim 16, wherein the all-inclusive directory of the respective node is configured to identify all cache lines of all caches of the respective node, wherein the first node of the processor system determines whether a requested cache line is held in caches of the first node by interrogating only the all-inclusive directory of the SC function of the first node and not interrogating respective caches of CP clusters of the first node.

* * * * *